United States Patent
Ansley et al.

[11] Patent Number: 6,122,051
[45] Date of Patent: Sep. 19, 2000

[54] MULTI-SLIT SPECTROMETER

[75] Inventors: David A. Ansley, Los Angeles; Lacy G. Cook, El Segundo, both of Calif.

[73] Assignee: Raytheon Company, Lexington, Mass.

[21] Appl. No.: 09/090,712

[22] Filed: Jun. 4, 1998

[51] Int. Cl.[7] ..................................................... G01J 3/14
[52] U.S. Cl. .......................... 356/326; 356/308; 356/51; 250/339.05
[58] Field of Search .................... 356/308, 326, 356/328, 51; 250/339.01, 339.02, 339.05

[56] References Cited

U.S. PATENT DOCUMENTS

| | | | |
|---|---|---|---|
| 3,279,308 | 10/1966 | Bartz et al. | 356/51 |
| 3,519,816 | 7/1970 | Bartz et al. | 356/51 |
| 5,627,639 | 5/1997 | Mende et al. . | |
| 5,768,040 | 6/1998 | Macenka et al. | 356/328 |

FOREIGN PATENT DOCUMENTS

| | | | |
|---|---|---|---|
| 0 509 770 A2 | 10/1992 | European Pat. Off. . | |
| 0 642 005 A1 | 3/1995 | European Pat. Off. . | |
| 2-275326 | 11/1990 | Japan | 356/328 |
| 6-241897 | 9/1994 | Japan | 356/328 |
| 1184633 | 3/1970 | United Kingdom . | |
| 2317446 | 3/1998 | United Kingdom | 356/328 |
| WO 98/10254 | 3/1998 | WIPO . | |

*Primary Examiner*—F. L. Evans
*Attorney, Agent, or Firm*—Colin M. Raufer; Leonard A. Alkov; Glenn H. Lenzen, Jr.

[57] ABSTRACT

A multi-slit spectrometer is combined with a two-dimensional detector array to enable simultaneous spectral analysis of several objects, improving the signal-to-noise ratio of multispectral imagery. The multi-slit spectrometer includes a multi-slit structure defining a plurality of parallel thin slits, and a first lens for directing object light onto the multi-slit structure. A second lens collimates and directs light which has passed through the slits of the multi-slit structure onto a light dispersing element such as a dispersing prism or a diffraction grating. A third lens focuses light which has passed through the light dispersing element onto the two-dimensional detector array at an image plane. A two dimensional detector array of detector elements is placed at the image plane. The slits are separated by a separation distance equal to an integral multiple of the detector width dimension, where the multiple is equal to (N times the number of slits) plus or minus one, where N is an integer. In an airborne sensor, a mirror which rotates at an angular velocity related to the velocity of the airborne platform directs object light onto the first lens, freezing the image from one or more objects onto the multi-slit structure for an integration time.

15 Claims, 5 Drawing Sheets

MULTI-SLIT SPECTROMETER

TECHNICAL FIELD OF THE INVENTION

This invention relates to the field of spectrometry, and more particularly to a multi-slit spectrometer in combination with a two-dimensional detector array to enable simultaneous spectral analysis of several objects.

BACKGROUND OF THE INVENTION

Figure 1:
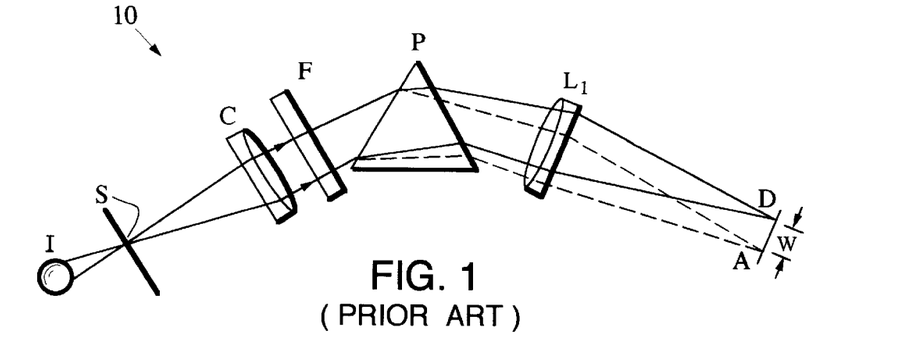
FIG. 1 is a simplified schematic diagram of a conventional single-slit spectrometer.

A spectrometer is used to analyze a beam of light into its component colors. FIG. 1 illustrates a simple prism spectrometer 10. Light from a luminous source I passes through a slit S and is collimated by lens C before impinging on the prism P. The index of refraction of the prism P varies as a function of wavelength. This is called dispersion. The index of refraction is greater for shorter wavelengths. Therefore, by Snell's law, the prism bends the violet light into a larger angle than the red light. Lens $L_1$ focuses the light and forms a real image of the slit S at image plane A. The real image is called the spectrum of the luminous source I. The width W of the real image is a function of the maximum-minimum wavelength range of the luminous source I, the dispersion of prism P, and the focal length of lens $L_1$.

As shown in FIG. 1, the lateral location of the image of the slit S in the image plane A is a function of the wavelength. If the light from luminous source I is monochromatic, i.e. a single wavelength (color), then only one image of the slit is formed. The color of the slit image is the color of the monochromatic light. If the light is polychromatic, i.e. white, then a continuum of slit images is formed, each at a slightly different location, and each at a slightly different color. In the example shown in FIG. 1, for example, the solid rays represent red light, and the dashed rays represent violet light.

It is well known that a thin straight slit is preferable to avoid overlapping of the images. If the slit is made wider, the purity of the slit images is reduced. In other words, at any point in image plane A, the image becomes a blend of slightly different wavelengths from the left, center and right side of the slit. This blending is the math function called convolution.

One application in which spectrometers are used is in obtaining aerial reconnaissance imagery, wherein the spectrometer is located on an aircraft, and a detector array is located at the image plane. Multispectral imagery is very low intensity because the spectrometer spreads the light received from objects on the ground across many detector elements.

SUMMARY OF THE INVENTION

A multi-slit spectrometer is described, and includes a multi-slit structure defining a plurality of thin slits, and a first lens for directing object light onto the multi-slit structure. A second lens collimates and directs light which has passed through the slits of the multi-slit structure onto a light dispersing element such as a dispersing prism or a diffraction grating. A third lens focuses light which has passed through the light dispersing element onto the two-dimensional detector array at an image plane. In an airborne sensor, a mirror which rotates at an angular velocity related to the velocity of the airborne platform directs object light onto the first lens, freezing the image from one or more objects onto the multi-slit structure for an integration time.

The multi-slit spectrometer can be combined with a two-dimensional detector array such as a CCD camera or an infrared focal plane array to provide simultaneous spectral analysis of several objects. For applications such as aerial reconnaissance, this multi-slit feature results in longer integration times and hence higher signal-to-noise ratios. The detector array comprises a plurality of detector elements having a width dimension in a direction transverse to a direction in which the slits extend. The slits are separated by a distance equal to a multiple of the width dimension, wherein the multiple is equal to N times the number of slits, plus or minus one, where N is an integer.

BRIEF DESCRIPTION OF THE DRAWING

These and other features and advantages of the present invention will become more apparent from the following detailed description of an exemplary embodiment thereof, as illustrated the accompanying drawings, in which.

DETAILED DESCRIPTION OF THE PREFERRED EMBODIMENT

One purpose of this invention is to improve the signal-to-noise ratio of multispectral aerial reconnaissance imagery. Multispectral imagery is very low intensity because the spectrometer spreads the light received from objects on the ground into a spectrum of length W in the image plane A of FIG. 1. The size of a detector element is D. The ratio of the spectrum length/detector element size (W/D) is the number of spectral bands that can be detected by the spectrometer. Because the energy in the spectrum is spread over many detector elements, the energy falling on each detector element is greatly reduced. For example, if the number of spectral bands is 49, then the intensity of the light falling on the detector element is 1/49th the level as compared to panchromatic imagery.

Figure 2:
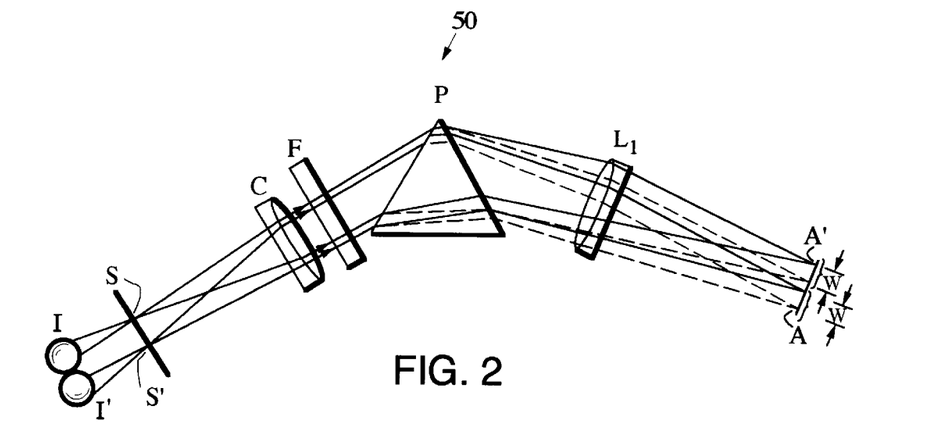
FIG. 2 is a simplified schematic diagram of a multi-slit spectrometer in accordance with an aspect of this invention.

FIG. 2 illustrates a multi-slit spectrometer 50 in accordance with an aspect of this invention. The multi-slit spectrometer is similar to the single slit spectrometer of FIG. 1, except that a second luminous source I' and a second slit S' parallel to the first slit is added, along with a bandpass filter F. The slits S and S' are imaged onto the detector plane A, with a magnification equal to $FL_{L1}/FL_C$, where $FL_{L1}$ and $FL_C$ are the focal lengths of the respective lenses $L_1$ and C. Note that the spectrum of luminous source I and luminous source I' are spatially separated in image plane A and A'. Thus, by adding a second slit, the prism spectroscope 50 may be used to simultaneously analyze the spectra from two luminous sources. The function of the bandpass filter F is to limit the maximum–minimum wavelength range of the luminous sources to the wavelength range of interest. Otherwise, the spectra from the two sources might overlap in image plane A. Typically a detector array will be located at the image plane. The length of each slit image should be at least equal to the length of the detector array, and the slit width, i.e. the slit dimension transverse to the longitudinal axis of the slit, is selected so that the slit opening image at the detector array is approximately equal to the width of the detector element.

Figure 3:
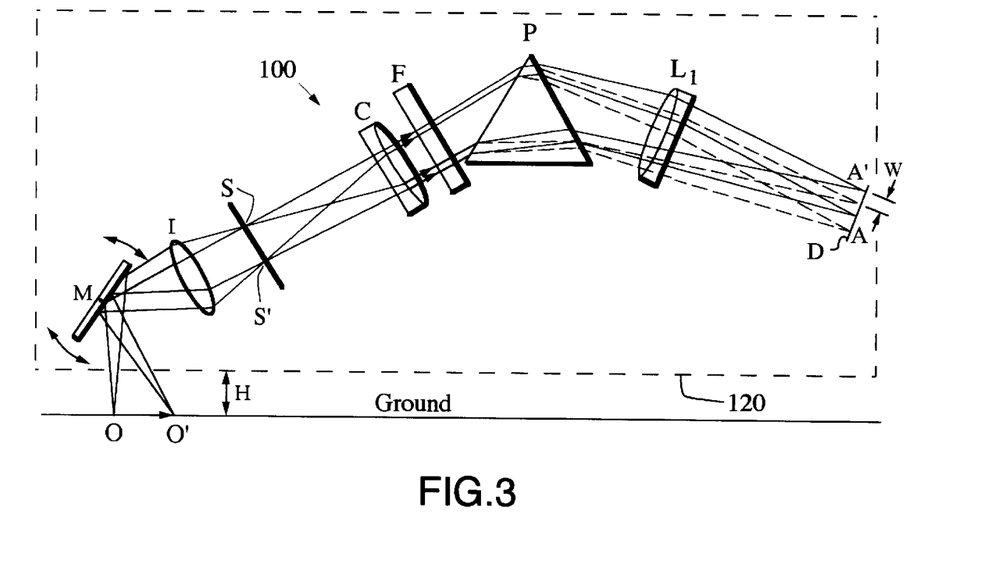
FIG. 3 illustrates a spectrometer system similar to the system of FIG. 2 except that a lens and a mirror are added in order to image a luminous (or illuminated) object on the ground.

FIG. 3 illustrates a spectrometer system 100, which is similar to the system of FIG. 2 except that a lens L and a rotatable mirror M are added in order to image a luminous (or illuminated) object such as an arrow O on the ground. The head of the arrow is imaged at slit S'. The foot of the arrow is imaged at slit S. For this example, it is assumed that the prism spectrometer 100 is installed on an unmanned airborne vehicle (UAV) 120 traveling at a velocity V and at an altitude H above the ground, and the slits extend in a direction transverse to the direction of movement of the UAV. The mirror M rotates at angular velocity $V_a$ in order to keep the image of the arrow O stationary on the slits S and S' for a period of time equal to the integration time of the detector array. Thus, the prism spectrometer 100 can simultaneously analyze the spectra of the head and foot of the arrow.

Figures 4A, 4B:
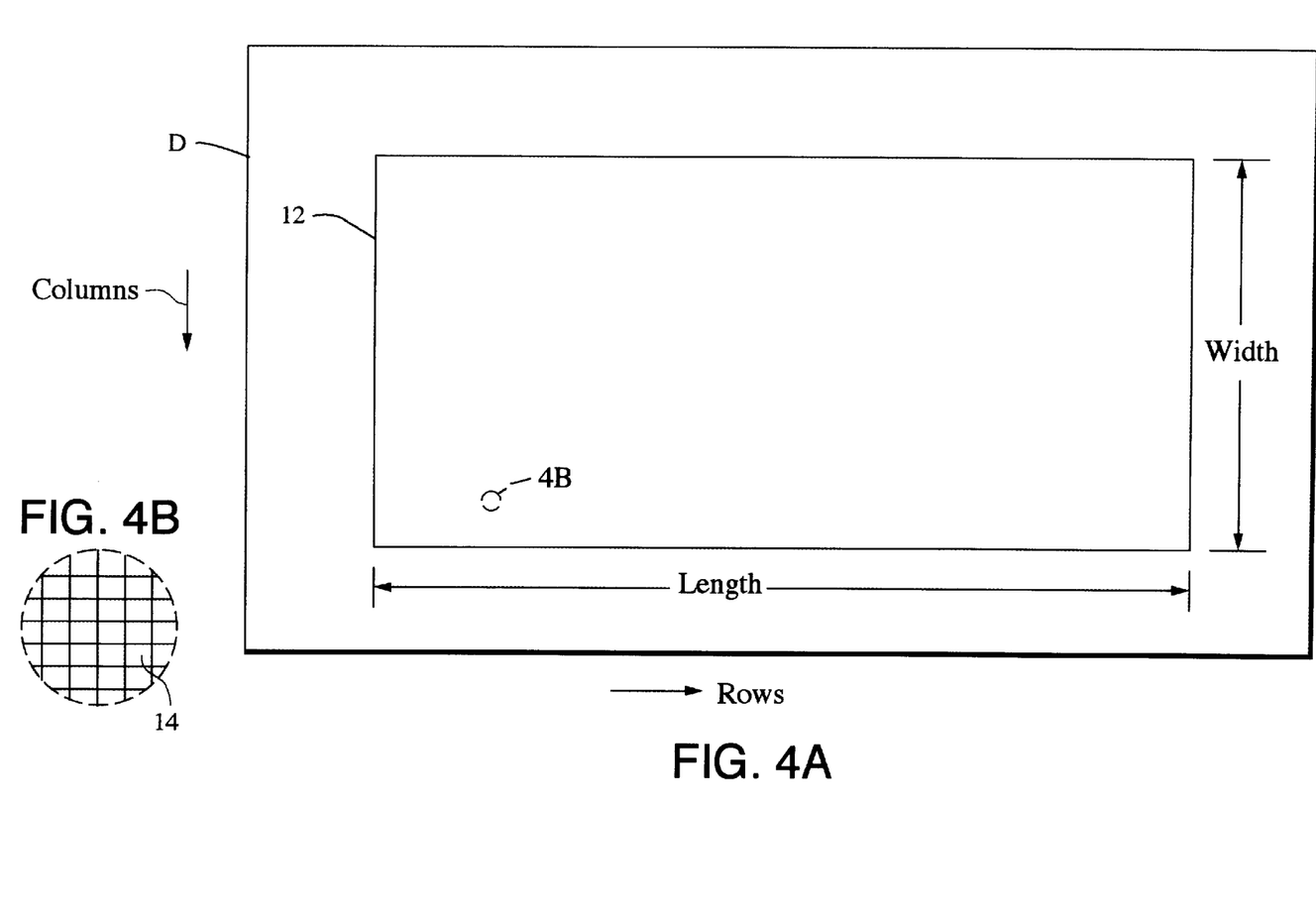
FIG. 4A shows in simplified form an exemplary detector array suitable for use in the spectrometer of FIG. 2.
FIG. 4B shows in enlarged view a small portion of the active area of the detector array of FIG. 4A, illustrating several of the individual elements.

A two-dimensional detector array D is located in image plane A-A'. The detector array D may be, for example, a CCD camera for the visible and near infrared (VNIR) or a focal plane array (FPA) for the infrared. FIG. 4A shows in simplified form an exemplary detector array D, including an active area 12. The active array area includes small detector elements arranged in rows and columns, with the rows extending in directions parallel to the slits. The detector elements are the individual, discrete sensors in the detector array. Each element is independent (isolated) from its neighbors and outputs electrical current in proportion to the number of photons incident on its top surface. By way of example only, one detector array suitable for the function has an active detector array area which is 7.84 mm by 12.8 mm, and each detector element is 20 microns by 20 microns. FIG. 4B shows in enlarged view a small portion of the active area 12, illustrating several of the individual elements 14. The width of the detectors in the CCD or FPA is ideally the same as the width of the image of the slits. The number of detectors onto which the spectrum falls is the number of bands. Thus, for example, if the number of detectors in the direction of the spectrum spread is 392, and the number of slits is 8, the number of bands is 392/8, or 49 bands. The change in wavelength across a detector is the spectral width of each band. For a typical prism spectrometer, the spectrum is from 1000–2500 nanometers. Thus the spectral width of each band, in this example, is (2500−1000)/49=30.612 nanometers. The physical width of the spectrum in image plane A-A' of this exemplary embodiment is 980 microns. The number of detectors is 49 and the size of the detectors is 20 microns.

A spectrometer reduces the energy on the detector by a factor of 1/(number of bands). In the above example, the number of bands is 49. Thus, the energy on a detector is 1/49 of the magnitude of the energy received at the slit (assuming no losses in the optics). This results in lower signal-to-noise ratios which might be compensated by longer detector integration times.

The integration time is limited because the UAV is moving at velocity V. For continuous spectral analysis of terrain at a ground resolution R, the maximum integration time using a single slit is R/V. For a typical mission, V 56 meters per second and R=0.665 meters. Therefore, the maximum integration time using a single slit is 0.665/56= 11.88 milliseconds. After 11.88 milliseconds, the next 0.665 meter wide ground swath must be imaged onto the slit S. Otherwise, there will be gaps in the terrain measurements.

Figure 5:
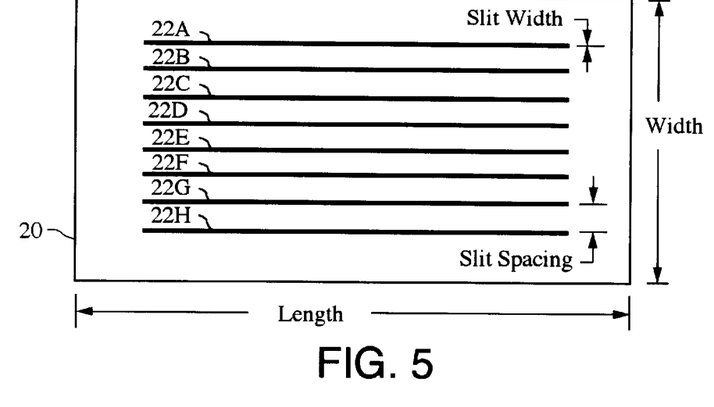
FIG. 5 illustrates an exemplary multi-slit structure suitable for the spectrometer of FIG. 2.

The solution is to use multiple parallel slits and a two dimensional detector array to increase the integration time. For example, assume the spectrometer includes a slit structure with eight parallel slits. FIG. 5 illustrates an exemplary slit structure 20. This structure 20 is 11 mm (height) by 17 mm (length). The structure 20 has defined therein 8 parallel slits 22A–22H, each of which is 0.02 mm wide and 12.8 mm long. The slits are separated by a distance of 0.98 mm.

Since there are 49 spectral bands, the two-dimensional detector array corresponding to the slit structure 20 should have 49×8=392 detector element rows. The energy through slit 22A is spread over detector rows 1–49, the energy through slit 22B is spread over rows 50–98, and so on, with the energy through slit 22H spread over rows 344–392. Because the prism spectrometer is simultaneously looking at eight swaths on the ground, the integration time is eight times longer (8×11.88 msec=95 msec). Therefore, the illuminance level needed for the eight slit spectrometer is only ⅛ as bright as needed for the single slit prism spectrometer. This is important for flying missions on dark and overcast days late in the afternoon or early in the morning under twilight conditions.

Figure 6:
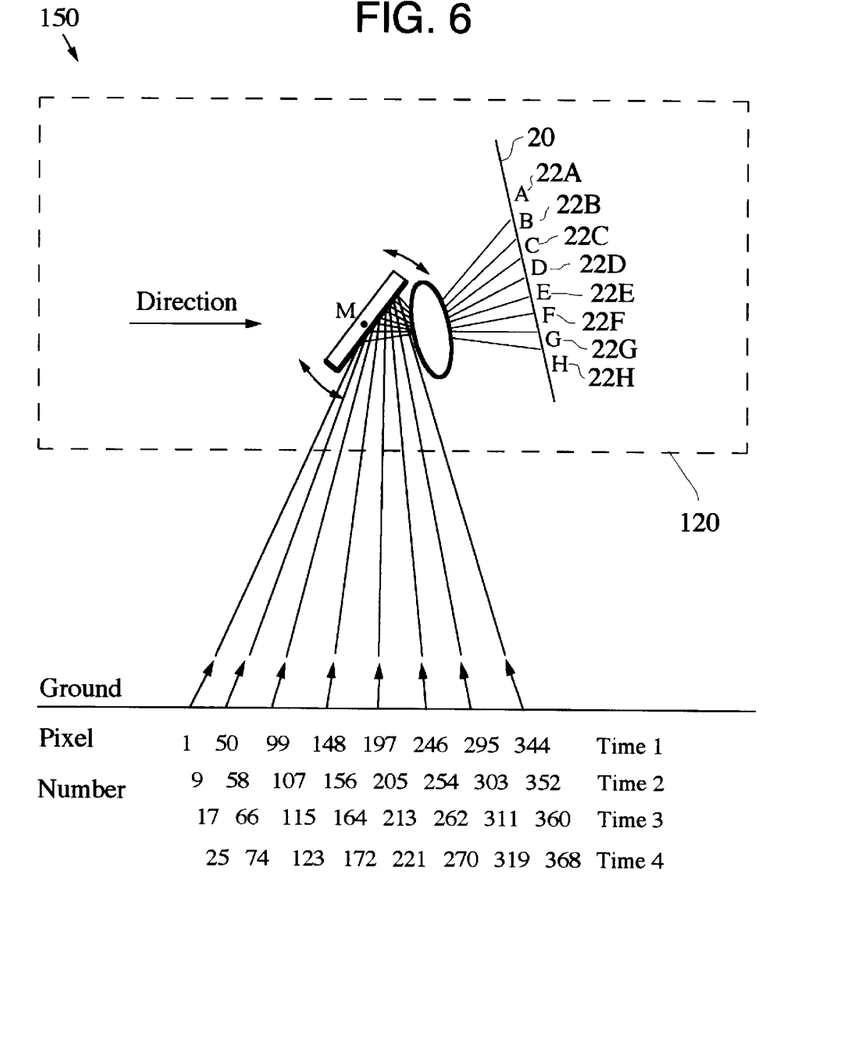
FIG. 6 shows a diagrammatic side view of an exemplary eight slit spectrometer in accordance with an aspect of the invention.

FIG. 6 shows a diagrammatic side view of an exemplary eight slit spectrometer 150 in accordance with an aspect of the invention. The system uses an 8 slit structure 20 as shown in FIG. 5, with slits 22A–22H. The numbering of the ground pixels imaged onto each slit is shown at the bottom of the figure for time periods 1–4. The rotatable backscan mirror M freezes the image of the ground onto the slits during the detector integration time. At the end of the integration time, the backscan mirror quickly resets to its original angle and starts the next backscan at time 2 (time 1+95 msec). Note that the image of the ground onto the slits has been shifted by exactly 8 ground pixels because the UAV travels 8 ground pixels in 95 msec (56 meters/sec×95 msec=5.32 meters/8 ground pixels=0.665 meters per ground pixel). This shift of 8 ground pixels is repeated every subsequent time period.

There will be no gaps in the reconnaissance of the terrain if the spacing of the slits (in detector element width units) is one more (or one less) than the modulo number of slits. Thus, the spacing of the slits will be equal to N times the number of the slits plus 1, times the detector element width, where N can be any integer number 1, 2, . . . N. For the example shown in FIG. 6, modulo=6. Modulo×number of slits=6×8+1=49. The slit spacing, for a detector width of 20 microns, will be 980 microns.

Table A shows the progression of filling in all the ground pixels in 49 time periods. By way of example, ground pixel 392 is imaged through slit A during time period 7, ground pixel 391 is imaged through slit B at time period 13, and so on.

TABLE A

| Time | H | G | F | E | D | C | B | A |
|---|---|---|---|---|---|---|---|---|
| 1 | 1 | 50 | 99 | 148 | 197 | 246 | 295 | 344 |
| 2 | 9 | 58 | 107 | 156 | 205 | 254 | 303 | 352 |
| 3 | 17 | 66 | 115 | 164 | 213 | 262 | 311 | 360 |
| 4 | 25 | 74 | 123 | 172 | 221 | 270 | 319 | 368 |
| 5 | 33 | 82 | 131 | 180 | 229 | 278 | 327 | 376 |
| 6 | 41 | 90 | 139 | 188 | 237 | 286 | 335 | 384 |
| 7 | 49 | 98 | 147 | 196 | 245 | 294 | 343 | 392 |
| 8 | 57 | 106 | 155 | 204 | 253 | 302 | 351 | 400 |
| 9 | 65 | 114 | 163 | 212 | 261 | 310 | 359 | 408 |
| 10 | 73 | 122 | 171 | 220 | 269 | 318 | 367 | 416 |
| 11 | 81 | 130 | 179 | 228 | 277 | 326 | 375 | 424 |
| 12 | 89 | 138 | 187 | 236 | 285 | 334 | 383 | 432 |
| 13 | 97 | 146 | 195 | 244 | 293 | 342 | 391 | 440 |
| 14 | 105 | 154 | 203 | 252 | 301 | 350 | 399 | 448 |
| 15 | 113 | 162 | 211 | 260 | 309 | 358 | 407 | 456 |
| 16 | 121 | 170 | 219 | 268 | 317 | 366 | 415 | 464 |
| 17 | 129 | 178 | 227 | 276 | 325 | 374 | 423 | 472 |
| 18 | 137 | 186 | 235 | 284 | 333 | 382 | 431 | 480 |
| 19 | 145 | 194 | 243 | 292 | 341 | 390 | 439 | 488 |
| 20 | 153 | 202 | 251 | 300 | 349 | 398 | 447 | 496 |
| 21 | 161 | 210 | 259 | 308 | 357 | 406 | 455 | 504 |
| 22 | 169 | 218 | 267 | 316 | 365 | 414 | 463 | 512 |
| 23 | 177 | 226 | 275 | 324 | 373 | 422 | 471 | 520 |
| 24 | 185 | 234 | 283 | 332 | 381 | 430 | 479 | 528 |
| 25 | 193 | 242 | 291 | 340 | 389 | 438 | 487 | 536 |
| 26 | 201 | 250 | 299 | 348 | 397 | 446 | 495 | 544 |
| 27 | 209 | 258 | 307 | 356 | 405 | 454 | 503 | 552 |
| 28 | 217 | 266 | 315 | 364 | 413 | 462 | 511 | 560 |
| 29 | 225 | 274 | 323 | 372 | 421 | 470 | 519 | 568 |
| 30 | 233 | 282 | 331 | 380 | 429 | 478 | 527 | 576 |
| 31 | 241 | 290 | 339 | 388 | 437 | 486 | 535 | 584 |
| 32 | 249 | 298 | 347 | 396 | 445 | 494 | 543 | 592 |
| 33 | 257 | 306 | 355 | 404 | 453 | 502 | 551 | 600 |
| 34 | 265 | 314 | 363 | 412 | 461 | 510 | 559 | 608 |
| 35 | 273 | 322 | 371 | 420 | 469 | 518 | 567 | 616 |
| 36 | 281 | 330 | 379 | 428 | 477 | 526 | 575 | 624 |
| 37 | 289 | 338 | 387 | 436 | 485 | 534 | 583 | 632 |
| 38 | 297 | 346 | 395 | 444 | 493 | 542 | 591 | 640 |
| 39 | 305 | 354 | 403 | 452 | 501 | 550 | 599 | 648 |
| 40 | 313 | 362 | 411 | 460 | 509 | 558 | 607 | 656 |
| 41 | 321 | 370 | 419 | 468 | 517 | 566 | 615 | 664 |
| 42 | 329 | 378 | 427 | 476 | 525 | 574 | 623 | 672 |
| 43 | 337 | 386 | 435 | 484 | 533 | 582 | 631 | 680 |
| 44 | 345 | 394 | 443 | 492 | 541 | 590 | 639 | 688 |
| 45 | 353 | 402 | 451 | 500 | 549 | 598 | 647 | 696 |
| 46 | 361 | 410 | 459 | 508 | 557 | 606 | 655 | 704 |
| 47 | 369 | 418 | 467 | 516 | 565 | 614 | 663 | 712 |
| 48 | 377 | 426 | 475 | 524 | 573 | 622 | 671 | 720 |
| 49 | 385 | 434 | 483 | 532 | 581 | 630 | 679 | 728 |
| 50 | 393 | 442 | 491 | 540 | 589 | 638 | 687 | 736 |
| 51 | 401 | 450 | 499 | 548 | 597 | 646 | 695 | 744 |
| 52 | 409 | 458 | 507 | 556 | 605 | 654 | 703 | 752 |

Many other combinations of modulo and number of slits are possible. However, the rule stated above must be followed in order to preclude having gaps in the reconnaissance of the terrain. If the rule is not followed, the scanning mirror angular scans will not be equal. The scanning mirror will have to periodically make a large scan in order to avoid having gaps. Also, the detector array time-off will increase.

Figure 7:
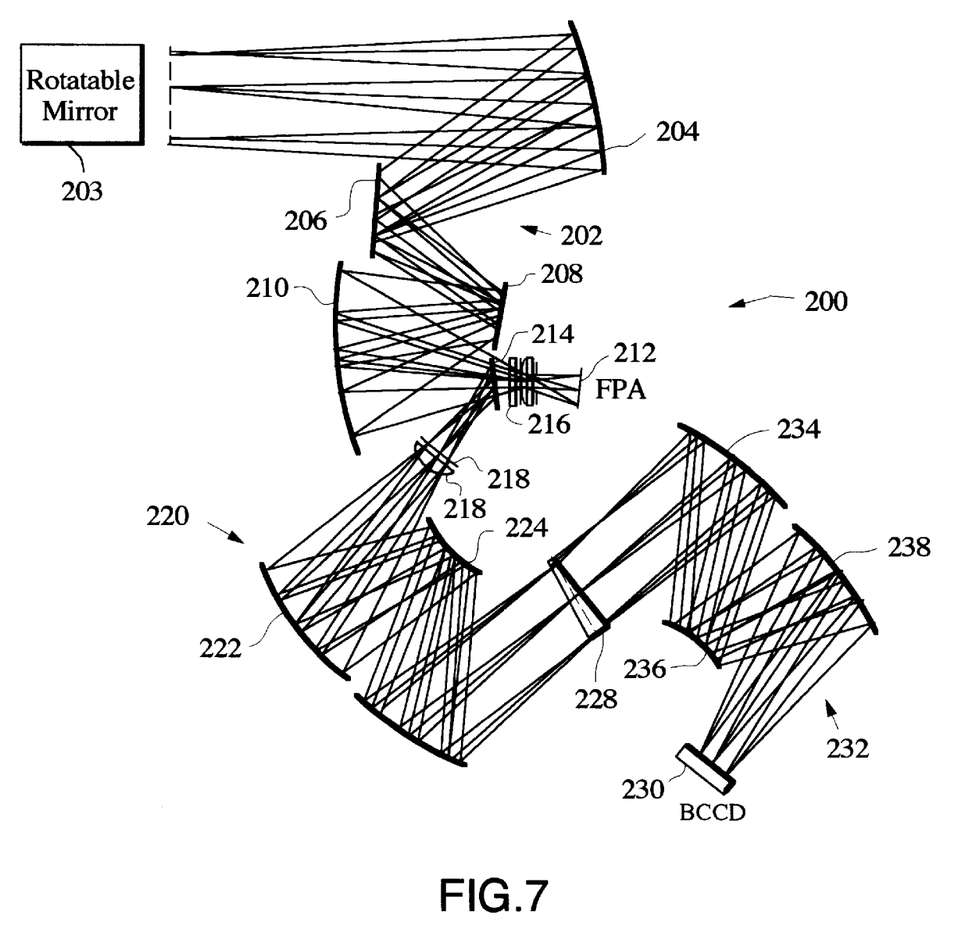
FIG. 7 illustrates a multi-slit spectrometer system for visible/near IR (VNIR) radiation in accordance with the invention.

FIG. 7 illustrates a multi-slit spectrometer system 200 for visible/near IR (VNIR) radiation, in the range of 0.4 micron to 1 micron, that also simultaneously functions as an SWIR imager. The reflective relayed imager 202 is generally the final optical assembly for the nominal staring sensor; the system 200 uses a rotatable mirror 203 to freeze the image of the ground for the integration period. The imager 202 in this example includes reflectors 204, 206, 208, 210, and provides the cold shielding required for operation of a cryogenically cooled IR detector focal plane array (FPA) 212. Of course, it will be recognized that the optical path to the FPA is not a spectrometer, but rather is a conventional imager. A dichroic beamsplitter 214 is inserted into the optical path of imager 202 immediately before the cryo-vac dewar window 216. Radiation with wavelengths shorter than those sensed by the IR focal plane array (FPA) 212 are split from the optical path by the beamsplitter 214 and are sent to the multi-slit structure 218 at the focus of imager 202 and then to the reflective triplet collimator 220. Collimator 220 in this example includes reflectors 222, 224 and 226. The collimator 220 receives radiation from the image formed by imager 202 and collimates it prior to spectral dispersion by the prism element 228. After the prism, the radiation is imaged onto a two dimensional detector array 230 such as a back illuminated charge coupled device (BCCD) by imager 232, which can be an identical copy of the optics used in collimator 220 if the detector array 230 used does not require cooling.

It is to be noted that the particular number of slits in the multi-slit structure will be dependent on the requirements of specific applications, and so an 8 slit structure is merely exemplary. In general, for applications requiring high spectral resolution, a multi-slit structure can be employed with fewer than 8 slits and larger spacing between slits, and a highly dispersive prism used. For applications where lower spectral resolution is needed, a slit structure with more than 8 slits (with closer spacing) can be employed, and a less dispersive prism is used such that the desired spectrum from each slit is dispersed over only a portion of the detector array. In this manner, the images of one slit formed by the shortest to the longest wavelength is immediately adjacent to the images of the next slit on the detector array. It should be noted that in the system 200 of FIG. 7, longer wavelength radiation can still be passed through the dichroic beamsplitter 214 into the cryo-vac dewar for detection by a cooled IR FPA.

Figure 8:
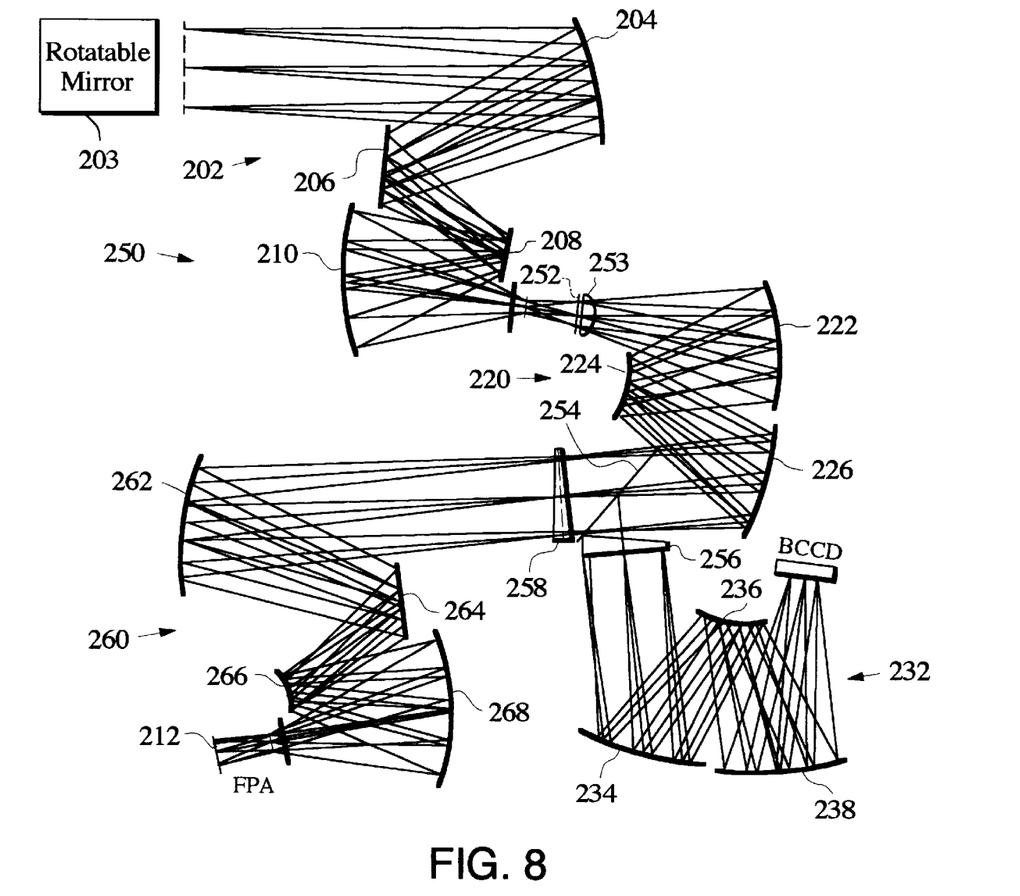
FIG. 8 illustrates a multi-slit spectrometer system embodying the invention, which is adapted for use in both VNIR and short wave infrared radiation (SWIR).

FIG. 8 illustrates a multi-slit spectrometer system 250 adapted for use in both VNIR (0.4–1 micron) and SWIR (1–2.5 micron). In the system 250 of FIG. 8, no beamsplitter is employed in imager 202, and the cooled IR detector array 212 is removed from the focus of imager 202. All radiation is passed through a slit structure 252 located at the focus of imager 202 and is collimated by the reflective triplet collimator 220.

In the collimated region following collimator 220, a dichroic beamsplitter 254 is used to divide the radiation into two parts. The shorter wavelengths are reflected by the beamsplitter 254 and pass through a dispersing prism 256 for imaging onto a room temperature array (BCCD) by imager 232. As in the system 200 of FIG. 5, imager 232 can be an identical copy of the optics used in collimator 220. The longer wavelengths are transmitted by the beamsplitter 254 and pass through another dispersing prism 258 for imaging onto a cryogenically cooled detector array 212 by imager 260.

Imager 260 includes reflectors 262, 264, 266 and 268, and can be an identical copy of imager 202, since it has the required relayed optical form to provide cold shielding.

The systems shown in FIGS. 7 and 8 are adapted to use in airborne applications. Other embodiments of the invention can be used for mid-wave IR (MWIR) and long-wave IR (LWIR) applications. The multi-slit spectrometer has utility for wavelengths between 0.4 microns and 12 microns.

Figure 9:
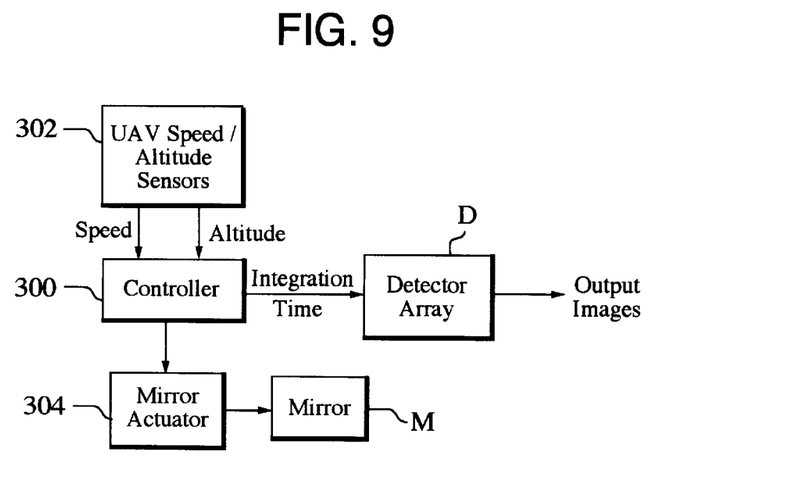
FIG. 9 is a simplified block diagram of a control system for a multi-slit spectrometer mounted on an airborne vehicle.

FIG. 9 is a simplified block diagram of the control system for a multi-slit spectrometer mounted for use on an airborne vehicle such as a UAV. The system includes a controller 300, which can be a microprocessor-based CPU, programmed with appropriate instructions to convert UAV speed and altitude data provided by UAV sensors 302 into mirror actuation commands and detector array control signals. The system also includes a mirror actuator 304 for moving the mirror M through a range of motion to hold the ground image stationary during an integration time. The controller 300 may include programming to compute the integration time based on the speed and altitude, and to control the detector array D, by an integration time command, to use this integration time.

The invention is applicable to systems operating in scanning mode as well as systems which operate in staring mode. A conventional scanning mode of operation of a conventional spectrometer occurs when the image of the ground is imaged on a slit S and there is no backscan mirror (or it is turned off). Thus, the invention can be employed in scanning mode by fixing the position of the mirror, or by removing the mirror. Of course, if the mirror is fixed, the ground image is convolved with the slit width, reducing resolution, and the integration time will be no longer than the integration time using a single slit. With a fixed mirror, the detector must be turned off for most of the time, i.e. the time-off fraction (number of slits minus one)/(number of slits).

It is understood that the above-described embodiments are merely illustrative of the possible specific embodiments which may represent principles of the present invention. For example, the invention has been described above for use with a dispersive prism, but a diffraction grating may be used in place of the dispersive prism. Other arrangements may readily be devised in accordance with these principles by those skilled in the art without departing from the scope and spirit of the invention.

What is claimed is:

1. A multi-slit spectrometer comprising:
   a multi-slit structure defining a plurality of parallel thin slits;
   a first optical structure for directing object light onto said multi-slit structure;
   a light dispersing element;
   an optical collimating device for collimating and directing light which has passed through said slits of said multi-slit structure onto said light dispersing element;
   an optical focusing structure for focusing light which has passed through said light dispersing element at an image plane; and
   a two-dimensional detector array disposed at said image plane
   wherein said detector array comprises a plurality of detector elements having a width dimension in a direction transverse to a direction in which the slits extend, and wherein said slits are separated by a distance equal to an integral multiple of said width dimension, wherein said integral multiple is equal to MN+1 of NM−1, where M is the number of slits and N is an integer.

2. A multi-slit spectrometer comprising:
   a multi-slit structure defining a plurality of parallel thin slits;
   a first optical structure for directing object light onto said multi-slit structure;
   a light dispersing element;
   an optical collimating device for collimating and directing light which has passed through said slits of said multi-slit structure onto said light dispersing element; and
   an optical focusing structure for focusing light which has passed through said light dispersing element at an image plane;
   wherein said spectrometer is mounted on a moving platform, and further comprising:
      a optical imaging device adapted to form an image of one or more objects on said multi-slit structure; and
      a mirror for directing object light from said one or more objects onto said optical imaging device, said mirror rotating at an angular velocity to keep said image of said one or more objects stationary at said multi-slit structure for an integration time.

3. A system for analyzing input energy in first and second different spectral bands, comprising:
   a first optical structure for directing said input energy onto a beam splitter, said beam splitter for directing first spectral band components of said input energy through a first optical path to a first sensor array and for directing second spectral band components of said input energy to a second optical path;
   a multi-slit spectrometer disposed in said second optical path for analyzing said second spectral band components, said spectrometer comprising:
      a multi-slit structure defining a plurality of parallel thin slits;
      a light dispersing element arranged so that light passing through the multi-slit structure impinges on said light dispersing element; and
      an optical apparatus for imaging light which has passed through the light dispersing element onto an image plane.

4. The system of claim 3 further comprising a two-dimensional detector array sensitive to spectral components in said second spectral band disposed at said image plane.

5. The system of claim 4 wherein said detector array comprises a plurality of detector elements having a width dimension in a direction transverse to a direction in which the slits extend, and wherein said slits are separated by a separation distance equal to an integral multiple of said width dimension, wherein said integral multiple is equal to NM+1 or NM−1, where M is the number of slits and N is an integer.

6. The system of claim 3 wherein said light dispersing element includes a prism.

7. The system of claim 3 further characterized in that the system is mounted on a moving platform, and further comprising a mirror for directing object light from one or more objects onto said first optical structure, said mirror rotating at an angular velocity to keep the image of said one or more objects stationary at said multi-slit structure for an integration time.

8. The system of claim 3 wherein said first spectral band is in the near infrared, and said first sensor array is a cryogenically cooled array.

9. The system of claim 3 wherein said second spectral band includes the visible spectra.

10. A system for analyzing input energy in first and second different spectral bands, comprising:
    a first optical structure for directing input energy onto a multi-slit structure defining a plurality of parallel thin slits;
    a collimator for collimating light which has passed through the multi-slit structure;
    a beam splitter for directing components of said input energy in a first energy band to a first optical path, and for directing components of said input energy in a second spectral band to a second optical path;
    a first light dispersing element disposed in the first optical path;

a second optical structure for imaging light which has passed through the first light dispersing element onto a first image plane;

a second light dispersing element disposed in the second optical path; and a third optical structure for imaging energy which has passed through the second light dispersing element onto a second image plane.

11. The system of claim 10 further comprising a two-dimensional detector array sensitive to energy in said first spectral band disposed at said first image plane.

12. The system of claim 11 wherein said detector array comprises a plurality of detector elements having a width dimension in a direction transverse to a direction in which the slits extend, and wherein said slits are separated by a separation distance equal to an integral multiple of said width dimension, wherein said integral multiple is equal to NM+1 or NM−1, where M is the number of slits and N is an integer.

13. The system of claim 10 wherein said first spectral band includes visible and near infrared spectral components, and said second spectral band includes short wave infrared components.

14. The system of claim 10 further characterized in that said system is mounted on a moving platform, and further comprising a mirror for directing object light from one or more objects onto said first optical structure, said mirror rotating at an angular velocity to keep the image of said one or more objects stationary at said multi-slit structure for an integration time.

15. A multi-slit spectrometer mounted on an airborne vehicle, comprising:

a multi-slit structure defining a plurality of parallel thin slits;

a first optical structure for directing object light onto said multi-slit structure;

a light dispersing element;

a second optical structure for directing light which has passed through said slits of said multi-slit structure onto said light dispersing element;

an optical focusing structure for focusing light which has passed through said light dispersing element at an image plane;

an optical imaging device adapted to form an image of one or more objects on said multi-slit structure;

a mirror for directing object light from said one or more objects onto said optical imaging device, said mirror rotating at an angular velocity to keep said image of said one or more objects stationary at said multi-slit structure for an integration time;

a mirror actuator for moving the mirror in response to mirror actuation commands; and a controller responsive to data indicative of the speed and altitude of the airborne vehicle for generating said mirror actuation commands to rotate said mirror at said angular velocity.

* * * * *